(12) United States Patent
Lee et al.

(10) Patent No.: US 7,467,449 B1
(45) Date of Patent: Dec. 23, 2008

(54) THIN PLATE DRILLING AND MILLING MACHINE

(76) Inventors: S. Peter Lee, 17900 Ridgeway Rd., Granada Hills, CA (US) 91344; Francis Pan, #31. Alley 41 Lane 159, Ging Ping Rd., Chung Ho, Taipei (TW) 23578

( * ) Notice: Subject to any disclaimer, the term of this patent is extended or adjusted under 35 U.S.C. 154(b) by 219 days.

(21) Appl. No.: 11/545,876

(22) Filed: Oct. 12, 2006

(51) Int. Cl.
*B23B 39/00* (2006.01)
(52) U.S. Cl. ..................... 29/26 A; 409/235
(58) Field of Classification Search ............... 700/114; 74/815; 408/234; 409/202, 203, 204, 121, 409/213, 235; 29/26 A, 26 R, 407.01, 407.05, 29/407.09, 559, 560.1
See application file for complete search history.

(56) References Cited

U.S. PATENT DOCUMENTS

| | | | |
|---|---|---|---|
| 5,375,952 A | 12/1994 | Line | |
| 5,569,004 A * | 10/1996 | Marantette | 409/235 |
| 5,857,815 A * | 1/1999 | Bailey et al. | 409/201 |
| 6,145,405 A * | 11/2000 | McMurtry et al. | 74/490.07 |
| 6,679,659 B1 | 1/2004 | Lasch et al. | |
| 6,733,217 B2 | 5/2004 | Schworer et al. | |
| 6,745,455 B2 | 6/2004 | Popp et al. | |
| 6,832,878 B2 | 12/2004 | Elrod et al. | |
| 6,960,052 B2 * | 11/2005 | Lutz et al. | 409/235 |
| 7,073,239 B2 * | 7/2006 | Miller | 29/407.05 |
| 7,143,494 B2 * | 12/2006 | Savoy | 29/407.1 |
| 7,171,738 B2 * | 2/2007 | Dick et al. | 29/563 |
| 7,185,412 B2 * | 3/2007 | Penick et al. | 29/26 A |
| 7,273,335 B2 * | 9/2007 | Furuhashi et al. | 409/202 |
| 2004/0244173 A1 * | 12/2004 | Miller | 29/407.05 |

* cited by examiner

*Primary Examiner*—Dana Ross
(74) *Attorney, Agent, or Firm*—Albert O. Cota

(57) ABSTRACT

A CNC drilling and milling machine comprised of a movable drill motor platform (20) with a laser reference point finder (30) in the form of a laser (34) that is attached to the machine adjacent a spindle (22). The reference point is aligned on the workpiece (26) with an identical reference located in a CNC computer (38). A workpiece holder (20) has two opposed bars (42) attached to a T-groove base of the drilling and milling machine, with each bar having a longitudinal notch (44) for holding the edges of a workpiece (26). A plate compression support and debris collecting member (62) collects debris and provides support for the workpiece (26). The entire platform is moved to drill or mill at predetermined computer selected positions, having the initial reference point (32) located with the calibrated laser beam.

18 Claims, 3 Drawing Sheets

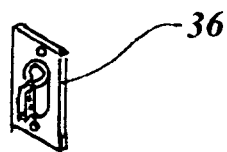
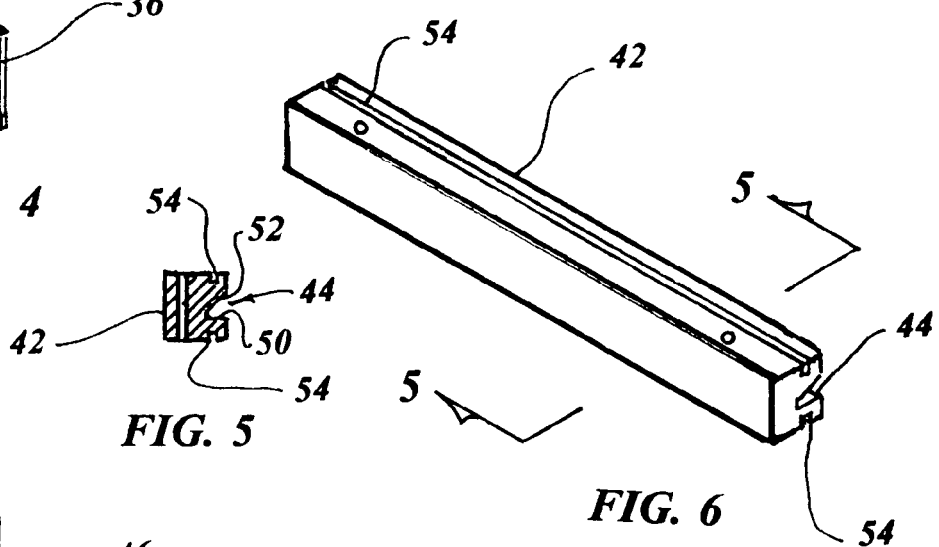
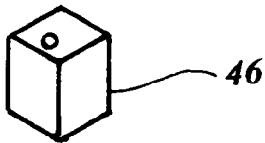
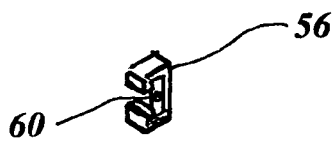
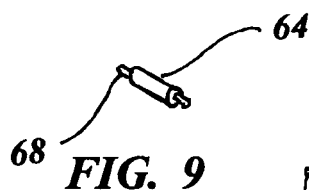
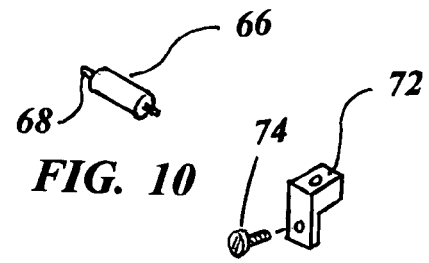
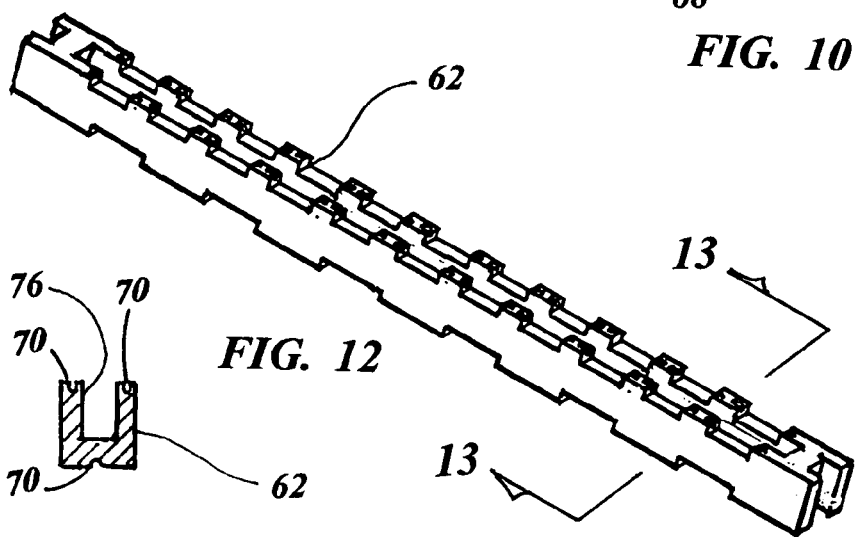

THIN PLATE DRILLING AND MILLING MACHINE

TECHNICAL FIELD

The invention generally pertains to drilling and milling machines, and more specifically to a Computer Numerical Control (CNC) machine having a reference point finder to locate an exact position on a workpiece, a thin plate workpiece holder and a compression support and debris collector for the workpiece.

BACKGROUND ART

Previously, many types of holding and centering devices have been used to provide an effective means for holding a workpiece in a machine tool such as a milling or drilling machine.

The prior art listed below did not disclose patents that possess any of the novelty of the instant invention; however the following U.S. patents are considered related:

| U.S. Pat. No. | Inventor | Issue Date |
| --- | --- | --- |
| 5,375,952 | Line | Dec. 27, 1994 |
| 6,679,659 | Lasch et al. | Jan. 20, 2004 |
| 6,733,217 B2 | Schworer et al. | May 11, 2004 |
| 6,745,455 B2 | Popp et al. | Jun. 8, 2004 |
| 6,832,878 B2 | Elrod et al. | Dec. 21, 2004 |

Line in U.S. Pat. No. 5,375,952 teaches a vertical milling and boring machine incorporating a gantry having two uprights on either side of a table. A tie joins the upper ends with a cross piece on the bottom of the table and a tool holder moves vertically on a carnage.

U.S. Pat. No. 6,679,659. issued to Lasch et al. is for a milling machine with a rotating spindle. The spindle is perpendicular to a workpiece stage that slants downward from a bed, and a chip collection chamber is positioned behind the work stage. Guides also are provided for a second carriage.

Schworer et al. in U.S. Pat. No. 6,733,217 B2 discloses a workpiece holding device for machine tools specifically a milling and/or drilling machine having a pivoting bridge supported between two walls. A drive motor pivots the bridge with a gear ring and a drive gear on the motor.

Popp et al. in U.S. Pat. No. 6,745,455 B2 teaches a machining apparatus having a lower and an upper housing. A tool holder is placed parallel to a tool axis on the lower side of the housing to hold a machining tool.

U.S. Pat. No. 6,832,878 B2 issued to Elrod et al. is for an automated quill drive assembly to retrofit a milling machine. A quill head includes a lower lug, a feed engagement control lever boss and a transmission cover. The assembly includes a housing for mounting to the lug. A sensor senses the position of the quill and provides output signals for both automatic and manual movement of the quill head.

DISCLOSURE OF THE INVENTION

There are some annoying problems with some conventional machine tools, in particular with a CNC drilling and milling machine. First, in a normal drilling or milling process, the operator is required to align the drill or milling bit at an exact location or reference point before the work can proceed. Ordinarily the alignment is accomplished by physically adjusting the X and Y axes until the exact starting position is located on the workpiece. It is necessary to repeat this time consuming process every time a new workpiece is mounted on the machine. It is also not only labor intensive but often inaccurate unless specific care is given each time the process is repeated.

Therefore, the primary object of the invention is to solve this alignment problem by using a laser pointing device to find the X and Y coordinates easily and repeatedly. This primary object is realized by mounting a low-power laser on a fixed Z axis that is parallel with a machine tool drill motor spindle such that the laser beam is always parallel to the Z axis and at fixed X and Y coordinates that are offset from the spindle tool head regardless of the vertical position of the spindle. In order to calibrate the invention a trial workpiece is mounted on the machine and a very small hole is drilled at an arbitrary location on the workpiece. The spindle of the machine is then walked in an X and Y direction until the laser beam coincides directly with the small hole. The X and Y coordinates are then stored in the CNC computer and are available for further reference. The calibration procedure is only required once; from then on the operator simply moves the laser beam to the reference point on any of the workpieces being drilled or milled. The computer identifies the offset that has been stored, thus making the spindle position always correct and accurate.

A second problem is related to holding a workpiece where thin plates such as metal and printed circuit boards are utilized. A thin plate may not have the structural integrity to remain completely flat when the drilling or milling is accomplished since downward pressure must be applied during the process. If the workpiece is bowed, the hole or shape is not at right angles to the flat surface. Therefore, it is necessary that some type of support is required underneath to support the thin material.

Therefore, an important object of the invention is to maintain a workpiece at a constant distance from the bottom of the workpiece to the bed of the drilling and milling machine regardless of the thickness of the workpiece to permit support from beneath. This object is accomplished by utilizing a pair of opposed workpiece holding bars, with each bar having longitudinal notches configured to hold the edges of a workpiece in a horizontal position. The longitudinal notch within each opposed bar has a horizontal bottom surface configured to interface with a bottom portion of the thin plate workpiece, and a sloped top angle surface configured to interface with a top edge of various thickness of the thin plate workpiece, thereby being capable of accommodating a wide variety of workpieces while always maintaining the proper bottom distance.

The third problem of a workpiece bowing under machining pressure is partially answered with the above configuration, which maintains the bottom of the workpiece at a constant height from the machine tool bed, thereby permitting a compression support to be employed. This arrangement allows another object of the invention to be realized with the utilization of a thin plate compression support and debris collecting member attached on each end to the machine tool platform such that a thin plate workpiece may be completely supported underneath when drilling or milling. An added benefit of the instant invention is the collection and storage of debris underneath the workpiece. In order to provide the proper clearance and prevent abrasion to the underside of the workpiece, a series of rollers are provided on the top surface of the compression support and debris collecting member. Rollers are also provided on the bottom surface of the member to slide easily over the machine tool bed while maintaining the exact height required.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a partial isometric view of the laser holding bracket in the preferred embodiment completely removed from the invention for clarity.

FIG. 5 is a cross-sectional view taken along lines 5-5 of FIG. 6.

FIG. 6 is a partial isometric view of one of the workpiece holder opposed bars of the preferred embodiment completely removed from the invention for clarity.

FIG. 7 is a partial isometric view of one of the legs for the workpiece holder opposed bar completely removed from the invention for clarity.

FIG. 8 is a partial isometric view of one of the C-shape slider brackets in the preferred embodiment completely removed from the invention for clarity.

FIG. 9 is a partial isometric view of one of the top rollers for the compression support and debris collecting member in the preferred embodiment completely removed from the invention for clarity.

FIG. 10 is a partial isometric view of one of the bottom rollers for the compression support and debris collecting member in the preferred embodiment completely removed from the invention for clarity.

FIG. 11 is a partial isometric view of one of the roller retaining brackets for securing the rollers in the compression support and debris collecting member completely removed from the invention for clarity.

FIG. 12 is a partial isometric view of the thin plate compression support and debris collecting member in the preferred embodiment completely removed from the invention for clarity.

FIG. 13 is a cross-sectional view taken along lines 13-13 of FIG. 12.

BEST MODE FOR CARRYING OUT THE INVENTION

Figure 1:
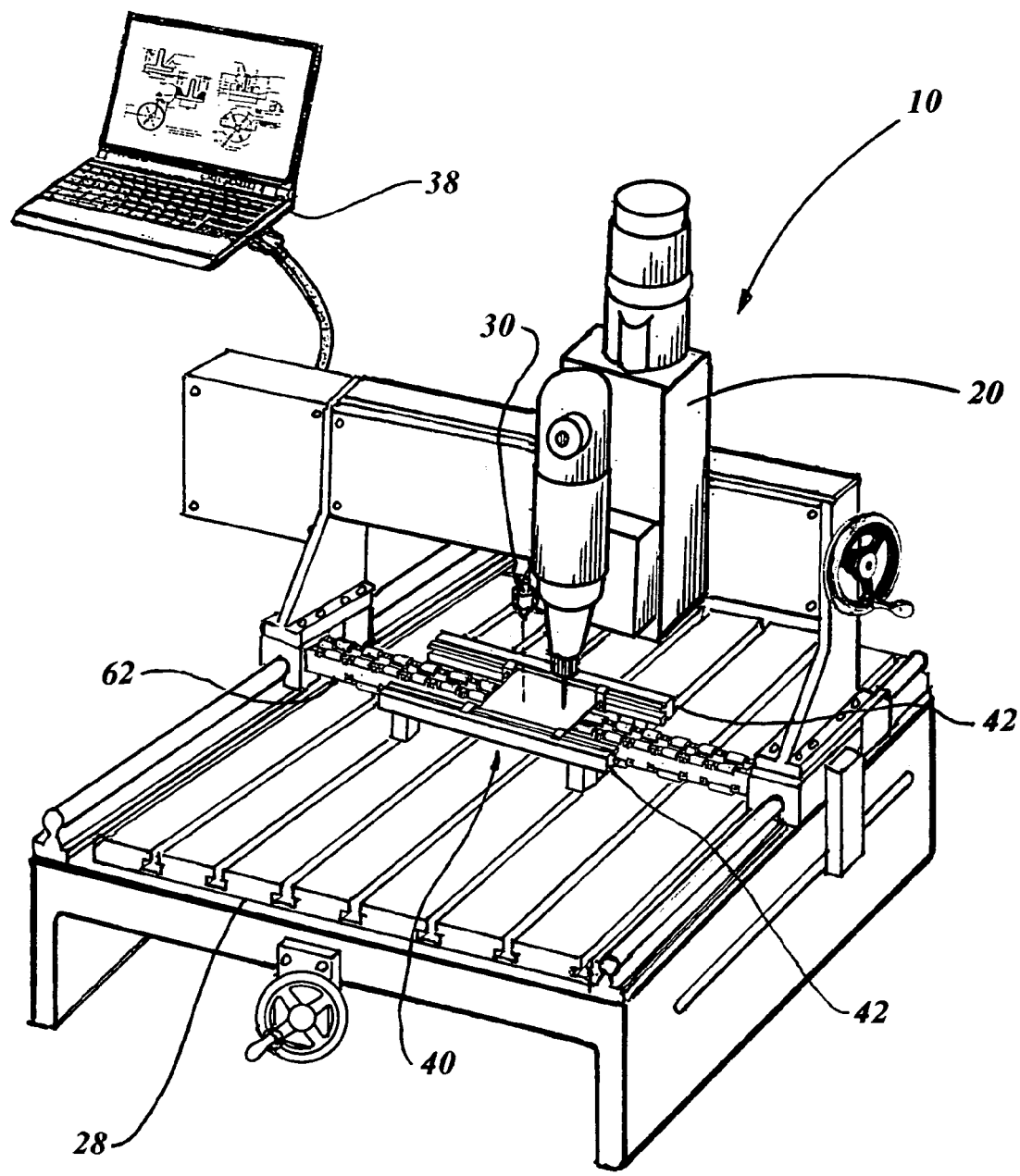
FIG. 1 is a partial isometric view of the thin plate drilling and milling CNC machine in the preferred embodiment
Figure 2:
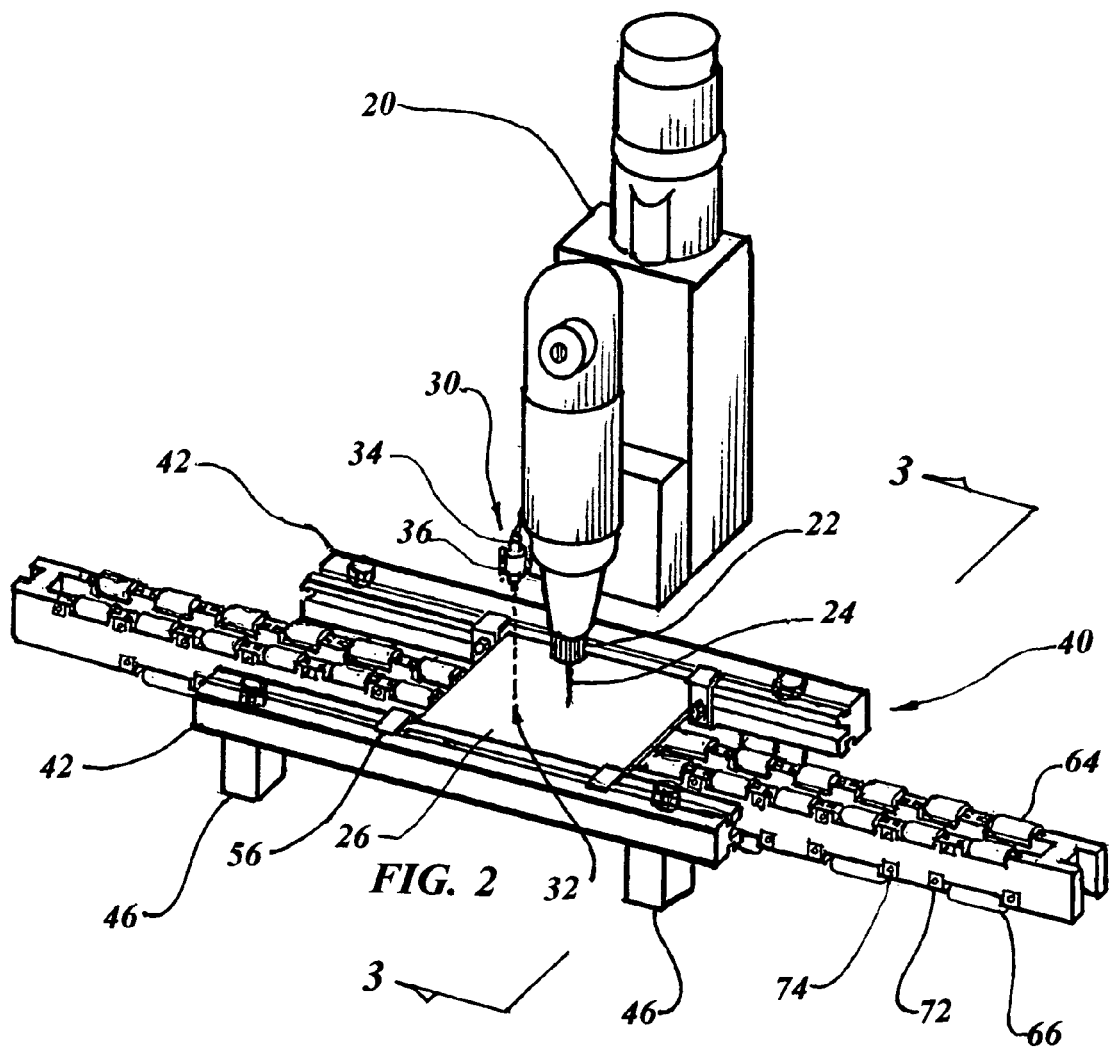
FIG. 2 is a fragmentary partial isometric view of the reference point finder, thin plate workpiece holder and the workpiece compression support and debris collector for the CNC machine.

The best mode for carrying out the invention is presented in terms of a preferred embodiment for a thin plate drilling and milling machine 10. The preferred embodiment, as shown in FIGS. 1 through 13, is comprised of a movable drill motor platform 20 having a rotating spindle 22 that holds a drill bit 24 for drilling or a milling bit for milling into a thin plate workpiece 26, as illustrated in FIG. 2. It should be noted that the milling bit is not illustrated as its configuration varies considerably according to the type of machining required and the bit is well known in the art and has been in use for well over a century. The movable drill motor platform 20 travels in the X and Y axis relative to a T-groove base 28 of the drilling and milling machine 10, with the rotating spindle 22 moving up and down in the Z axis.

A laser reference point finder 30 provides a laser beam that is displayed on the workpiece 26 to visually indicate a CNC reference point 32. The reference point finder 30 consists of a low voltage miniature laser 34 having a pin hole aperture mounted on an adjustable laser holding bracket 36. The bracket 36 is attached to the movable drill motor platform 20 parallel with the rotating spindle 22 and is adjustable in the X or Y axis to maintain its parallelism to the Z axis. The laser 34 receives its direct current electrical power from the drilling and milling machine's 10 CNC computer 38. The laser CNC reference point finder 30, which provides the laser point beam that is displayed on the workpiece 26, is calibrated to correspond to a reference point stored in the CNC computer 38, thereby creating the visually displayed reference point 32.

Figure 3:
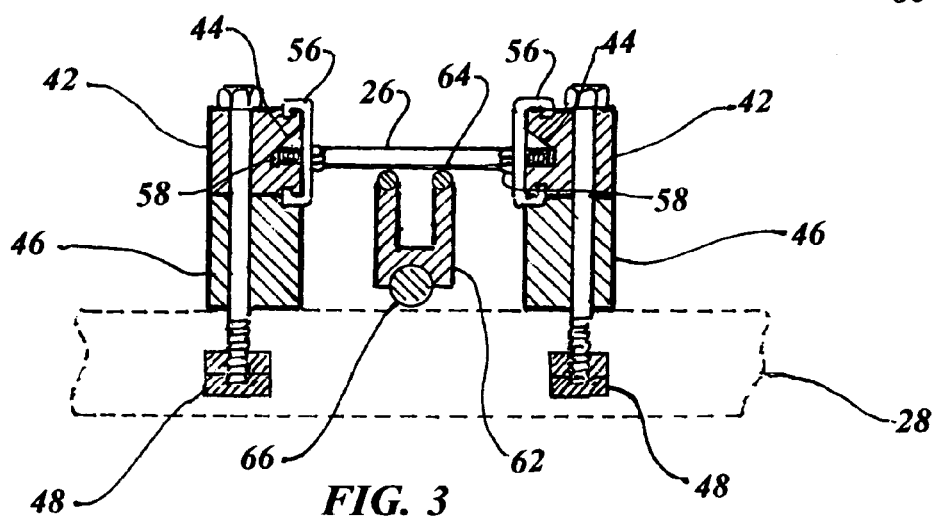
FIG. 3 is a cross-sectional view taken along lines 3-3 of FIG. 2.

A thin plate workpiece holder 40 is utilized, which consists of two opposed bars 42 that are spaced apart essentially the width of the workpiece 26, with the bars 42 attached to the T-groove base 28 of the drilling and milling machine 10. Each bar 42 includes a longitudinal notch 44 that is configured to hold the edges of the workpiece 26 in a rigid horizontal position. At least two legs 46 are mounted under each of the two opposed bars 42 that are attached to the T-groove base 28 with a T-slot nut 48, as shown in FIG. 3. Each longitudinal notch 44 has a horizontal bottom surface 50 that interfaces with a bottom portion of the workpiece 26, and a sloped top angle surface 52 that interfaces with a top edge of the workpiece to accommodate various thicknesses.

Each opposed bar 42 includes longitudinal shallow grooves 54 in both top and bottom surfaces, as illustrated in FIGS. 2, 3, 6 and 7. A C-shaped slider bracket 56, as shown in FIG. 8, slides into the top and bottom shallow grooves 54 and interfaces with an edge of the workpiece 26 for retention in lateral directions, as depicted in FIGS. 2 and 3. A threaded fastener 58 is disposed within a threaded bore 60 of each C-shaped slider bracket 56 to intimately embrace the longitudinal notches 44 in the opposed bars 42, thereby retaining each bracket 56 securely.

A thin plate compression support and debris collecting member 62 is attached on each end of the movable drill motor platform 20 for collecting debris and providing support underneath the workpiece 26 when drilling or milling. The member 62 utilizes a plurality of top rollers 64 recessed into its top surface for interfacing with the bottom of the workpiece 26. Likewise, bottom rollers 66 are recessed into a bottom surface of the member 62 for interfacing with the T-groove base 28. Both the top rollers 64 and bottom rollers 66 have a stub shaft 68 protruding from each end that rests in shaft recesses 70, as illustrated in FIG. 13. An angle bracket 72 is provided for both rollers 64 and 66 to cover the stub shafts 68 imbedded in the recesses 70 and is held in place with a screw 74.

The member 62 further contains a debris retaining recess 76 in its top surface for collecting and storing debris created by drilling or milling a workpiece 26 by the machine 10, as shown in FIG. 12. The member 62 slideably interfaces with a gate post of the drilling and milling machine's movable drill motor platform 20. Details of the member 62, rollers 66 and 68, along with the angle bracket 72, are illustrated in FIGS. 2, 3, and 9-13.

Initially the thin plate drilling and milling machine 10 requires the laser 34 to be adjusted in its bracket 36 by moving the spindle 22 up and down until a true parallel relationship is achieved therebetween. The laser 34 is then calibrated as described previously and the fixed offset X and Y coordinates are stored in the CNC computer 38. The platform may be moved by directions from the computer 38 to drill or mill at the predetermined computer selected positions, having the initial reference point 32 located with the beam from the calibrated laser 34.

An alternate embodiment of the thin plate drilling and milling machine 10 utilizes a stationary drill motor platform and a stationary U-shape support and debris collector 62 instead of the movable platform, and a movable U-shape support and debris collector 62. The balance of the elements of the invention remain unchanged.

While the invention has been described in detail and pictorially shown in the accompanying drawings, it is not to be limited to such details, since many changes and modifications may be made to the invention without departing from the spirit and scope thereof. For example, the laser reference point finder can be utilized on various type of CNC machines to locate a reference point that is displayed on a workpiece and that is calibrated to correspond with a reference point stored in a CNC computer. Hence, it is described to cover any and all modifications and forms which may come within the language and scope of the appended claims.

The invention claimed is:

1. A drilling and milling machine which comprises:
    a) a laser reference point finder for providing a laser beam that is displayed on a workpiece to visually indicate a CNC reference point,
    b) a workpiece holder having opposed bars attached to the drilling and milling machine, with each bar configured to hold edges of the workpiece in a horizontal position, and
    c) a compression support and debris collecting member that permits the workpiece to be supported from below, with the machine drilling or milling at predetermined computer selected positions, having the initial reference point located with the laser CNC reference point finder.

2. A thin plate drilling and milling machine which comprises:
    a) a stationary drill motor platform having a rotating spindle that holds a drill bit for drilling and a milling bit for milling into a thin plate workpiece,
    b) a laser reference point finder for providing a laser beam that is displayed on the workpiece to visually indicate a CNC reference point,
    c) a thin plate workpiece holder having opposed bars attached to the drilling and milling machine, with each bar configured to hold edges of the workpiece in a horizontal position, and
    d) a compression support and debris collecting member that permits the thin plate workpiece to be supported from below, with the machine drilling or milling at predetermined computer selected positions, having the initial reference point located with the laser CNC reference point finder.

3. A thin plate CNC drilling and milling machine which comprises:
    a) a movable drill motor platform having a rotating spindle that holds a drill bit for drilling and a milling bit for milling into a thin plate workpiece,
    b) a laser CNC reference point finder having a laser attached to the drilling and milling machine such that a laser beam is displayed on the workpiece, with the laser beam calibrated to correspond to a reference point in a CNC computer,
    c) a thin plate workpiece holder defined as two opposed bars attached to a T-groove base of the drilling and milling machine, with each bar having a longitudinal notch that is configured to hold edges of the workpiece in a horizontal position, and
    d) a thin plate compression support and debris collecting member attached on each end to the movable drill motor platform such that the thin plate workpiece may collect debris and be supported from below when drilling or milling, further the platform may be moved to drill or mill at a predetermined computer selected position, having the initial reference point located with the calibrated laser beam.

4. The thin plate drilling and milling machine as recited in claim 3 wherein said movable drill motor platform travels in an X axis and a Y axis relative to the T-groove base of the drilling and milling machine, with the rotating spindle moving up and down in a Z axis.

5. The thin plate drilling and milling machine as recited in claim 3 wherein said laser CNC reference point finder further comprises a low voltage miniature laser having a pin-hole aperture.

6. The thin plate drilling and milling machine as recited in claim 5 further comprising an adjustable laser holding bracket mounted to the movable drill motor platform parallel with the rotating spindle for retaining the low voltage miniature laser.

7. The thin plate drilling and milling machine as recited in claim 3 wherein said thin plate workpiece holder two opposed bars are spaced apart essentially the width of the workpiece.

8. The thin plate drilling and milling machine as recited in claim 7 further comprising at least two legs mounted under each of the two opposed bars, with the at least two legs are attached to the T groove base with a T-slot nut.

9. The thin plate drilling and milling machine as recited in claim 3 wherein each longitudinal notch within each opposed bar further comprises a horizontal bottom surface configured to interface with a bottom portion of said thin plate workpiece.

10. The thin plate drilling and milling machine as recited in claim 3 wherein each longitudinal notch within each opposed bar further comprises a sloped top angle surface configured to interface with a top edge of various thickness of said thin plate workpiece.

11. The thin plate drilling and milling machine as recited in claim 3 wherein each thin plate workpiece holder further having opposed bar longitudinal shallow grooves in both top and bottom surfaces.

12. The thin plate drilling and milling machine as recited in claim 11 further comprising a plurality of C-shaped slider brackets configured to slide into the top and bottom shallow grooves and interface with an edge of the workpiece for retention thereof.

13. The thin plate drilling and milling machine as recited in claim 12 further comprising a threaded fastener threadably disposed within each C-shaped slider bracket for intimately embracing the longitudinal shallow grooves in the opposed bars of the thin plate workpiece holder, thereby securely retaining the bracket.

14. The thin plate drilling and milling machine as recited in claim 3 wherein said thin plate compression support and debris collecting member further comprises a plurality of top rollers recessed into a top surface of the support and debris collecting member interfacing with the workpiece.

15. The thin plate drilling and milling machine as recited in claim 3 wherein said thin plate compression support and debris collecting member further comprises a plurality of bottom rollers recessed into a bottom surface of the support and debris collecting member interfacing with the T-groove base.

16. The thin plate drilling and milling machine as recited in claim 3 wherein said thin plate compression support and debris collecting member having a debris retaining recess in a top surface for collecting and storing debris created by drilling or milling the workpiece.

17. The thin plate drilling and milling machine as recited in claim 3 wherein said thin plate compression support and debris collecting member slideably interfaces with a gate post of the drilling and milling machine movable drill motor platform.

18. The thin plate drilling and milling machine as recited in claim 3 wherein said laser reference point finder can be utilized on various types of CNC machines to locate a reference point that is displayed on a workpiece, wherein the workpiece reference point is calibrated to correspond with a reference point stored in a CNC computer.

* * * * *